United States Patent
Maguire et al.

(10) Patent No.: US 9,133,762 B2
(45) Date of Patent: Sep. 15, 2015

(54) DRIVE BELT TENSIONER FOR MOTOR GENERATOR UNIT

(75) Inventors: Joel M. Maguire, Northville, MI (US); William C. Deneszczuk, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 848 days.

(21) Appl. No.: 12/562,524

(22) Filed: Sep. 18, 2009

(65) Prior Publication Data
US 2011/0070986 A1 Mar. 24, 2011

(51) Int. Cl.
*F16H 7/12* (2006.01)
*F02B 67/06* (2006.01)
*F16H 7/08* (2006.01)

(52) U.S. Cl.
CPC .............. *F02B 67/06* (2013.01); *F16H 7/1281* (2013.01); *F16H 2007/0808* (2013.01); *F16H 2007/0874* (2013.01); *F16H 2007/0893* (2013.01)

(58) Field of Classification Search
CPC .......... F16H 2007/0874; F16H 7/1281; F16H 2007/081; F16H 2007/0806; F16H 2007/0846
USPC ................................................. 474/134, 135
See application file for complete search history.

(56) References Cited

U.S. PATENT DOCUMENTS

| | | | |
|---|---|---|---|
| 315,735 A * | 4/1885 | Colburn | 474/134 |
| 518,314 A * | 4/1894 | Egger et al. | 474/109 |
| 611,170 A * | 9/1898 | Howard | 474/134 |
| 952,156 A * | 3/1910 | Trewella | 474/131 |
| 976,115 A * | 11/1910 | Bard | 474/134 |
| 1,016,787 A * | 2/1912 | Sewall | 474/109 |
| 4,019,397 A * | 4/1977 | Bochan | 474/109 |
| 4,758,208 A * | 7/1988 | Bartos et al. | 474/135 |
| 6,165,092 A * | 12/2000 | Bramham et al. | 474/134 |
| 6,609,989 B2 * | 8/2003 | Bogner et al. | 474/134 |
| 6,648,783 B1 * | 11/2003 | Bogner | 474/134 |
| 6,652,401 B2 * | 11/2003 | Liu | 474/134 |
| 6,857,978 B2 * | 2/2005 | Polster et al. | 474/134 |
| 2002/0039944 A1 | 4/2002 | Ali et al. | |
| 2003/0109342 A1 * | 6/2003 | Oliver et al. | 474/134 |
| 2006/0217222 A1 * | 9/2006 | Lolli et al. | 474/134 |
| 2008/0070730 A1 * | 3/2008 | Nelson et al. | 474/134 |
| 2008/0139354 A1 * | 6/2008 | Bogner | 474/134 |

FOREIGN PATENT DOCUMENTS

CN 1468347 A 1/2004

OTHER PUBLICATIONS

Chinese Office Action for Application No. 201010287817.3; 6 pages.

* cited by examiner

*Primary Examiner* — Henry Liu
(74) *Attorney, Agent, or Firm* — Cantor Colburn LLP

(57) ABSTRACT

A drive belt tensioner for mounting to a motor-generator unit comprises a tensioner pulley support having a centrally located pivot defining a pivot axis and first and second reaction arms extending outwardly from the centrally located pivot to define an angle therebetween. Tensioner pulleys are rotatably mounted to the second ends of each of the first and second reaction arms. The reaction arms are configured to flexibly bias the tensioner pulleys when engaged by a drive belt force to maintain a desired drive belt tension.

12 Claims, 4 Drawing Sheets

DRIVE BELT TENSIONER FOR MOTOR GENERATOR UNIT

FIELD OF THE INVENTION

This invention relates to internal combustion engines and, more particularly, to an engine accessory drive system and drive belt tensioner for such drive system.

BACKGROUND

Belt Alternator Starter ("BAS") powertrain systems for hybrid vehicles differ from conventional, non-hybrid systems in that the torque to turn the accessory drive belt and related accessories is not always generated from the engine crankshaft through a crankshaft pulley. During engine operation, the engine crankshaft provides torque for rotating a Motor Generator Unit ("MGU"), or starter-generator, generally providing for taut and slack sides of the drive belt on opposite sides of an MGU pulley. During engine starting using the MGU however, the MGU drives the accessory drive belt and related accessories causing the slack side of the belt to switch to the opposite side of the MGU pulley. Accordingly, belt tensioners are generally required in such systems as are idler pulleys that are used to shorten drive belt spans to minimize the potential for drive belt slack.

During engine driven operation of the MGU and other accessories, the loads placed on the drive belt are determined by the power required to drive the accessories, including the MGU unit. The accessory drive loads are relatively light and, accordingly, require moderate to low belt tensioning to avoid belt slippage. On the other hand, during engine starting using the MGU, the MGU must supply power to rotate the engine (crankshaft, pistons, camshafts, etc.) as well as the accessories. Engine starts require a significantly higher level of belt tensioning to control motion on the slack side of the belt and to insure that the belt will not slip. Because of packaging requirements it is common to provide separate tensioner and idler arms and pulleys with different pivot locations to attain the necessary drive belt geometry. Multiple tensioners, idler arms and pulleys may increase the space required for the accessory drive system and may adversely impact the packaging of the BAS powertrain system in some vehicle architectures.

SUMMARY

In an exemplary embodiment a drive belt tensioner for mounting to a motor-generator unit comprises a tensioner pulley support having a centrally located pivot defining a pivot axis and first and second reaction arms extending outwardly from the centrally located pivot to define an angle therebetween. Tensioner pulleys are rotatably mounted to first ends of each of the first and second reaction arms and are configured to bias a drive belt on both sides of a motor-generator unit pulley to maintain a desired drive belt tension during driving and driven modes of the motor-generator unit.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring the drawings in which.

DESCRIPTION OF THE EMBODIMENTS

Figure 1:
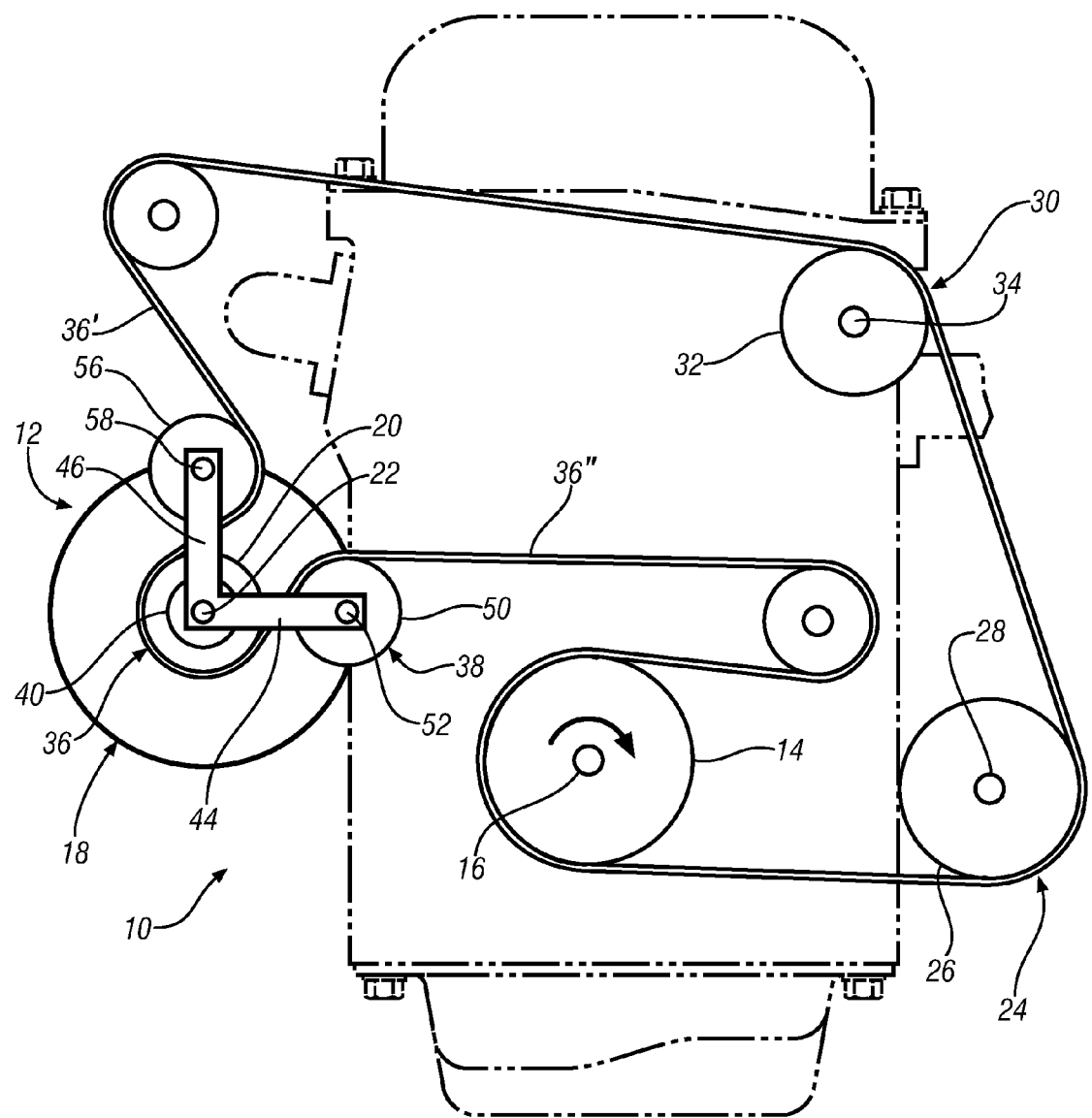
FIG. 1 is a front view of an engine system that embodies features of the present invention.

The following description is merely exemplary in nature and is not intended to limit the present disclosure, application or uses. It should be understood that throughout the drawings, corresponding reference numerals indicate like or corresponding parts and features.

In accordance with an exemplary embodiment, FIG. 1 schematically illustrates an engine 10, for a hybrid vehicle (not shown) having a Belt Alternator Starter ("BAS") accessory drive system 12. The BAS accessory drive system 12 includes an engine accessory drive pulley 14 mounted for rotation on the end of an engine crankshaft 16. A Motor Generator Unit ("MGU") 18 includes an electric machine that can be driven to act as an electric generator and produce electric power, or use electric power to drive the engine 10 as a starter. MGU 18, operative as a starter/generator, is mounted on the engine 10 at a lateral distance from the engine drive pulley 14 and includes an MGU drive pulley 20 mounted for rotation on the shaft 22 of the MGU rotor. An air conditioner compressor 24 may also be mounted on the engine 10 and includes an air conditioner drive pulley 26 mounted for clutched rotation on the shaft 28 of the air conditioner compressor 24. In addition, a water pump 30 is mounted on the engine 10 and similarly includes a water pump drive pulley 32 mounted for rotation on the shaft 34 of the water pump 30. Other similarly mounted accessory components, such as an air pump (not shown) or a power steering pump (not shown), may also be associated with the BAS accessory drive system 12. An accessory drive belt 36 is connected between and engages all of the drive and driven pulleys 14, 20, 26, 32 for rotating together the engine crankshaft 16, the MGU 18, the air conditioner compressor 24, the water pump 30 and any other optional accessories.

The MGU 18 serves both as a generator and as a starting motor when the vehicle is operating in a hybrid mode. The MGU is "driven" by drive belt 36 in the generating mode but "drives" the belt 36 in the starting or cranking mode. In the generating mode, the upper run 36' of the drive belt 36 is tight while the lower run 36" is slack. The situation is reversed during the starting or cranking mode so that the upper run 36' is slack, while the lower run 36" is tight. To properly tension the drive belt 36, the BAS accessory drive system 12 includes one or more tensioners and idler pulleys in order to prevent slippage of the drive belt when the MGU 18 is in either the driven or the driving mode.

Figure 2:
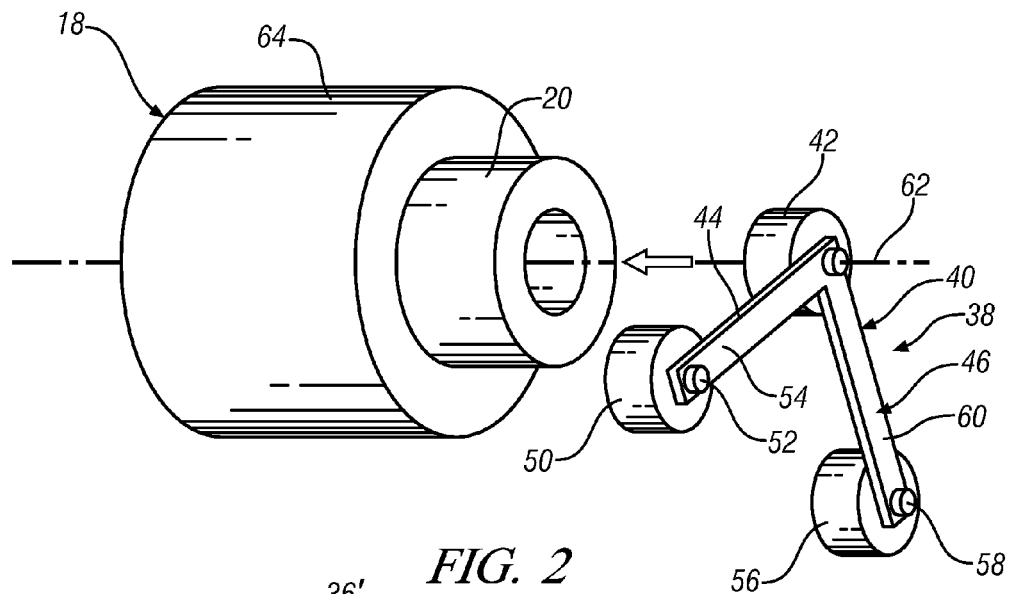
FIG. 2 is a perspective, partially disassembled view of a motor-generator unit and drive belt tensioner from the engine system of FIG. 1.
Figure 3:
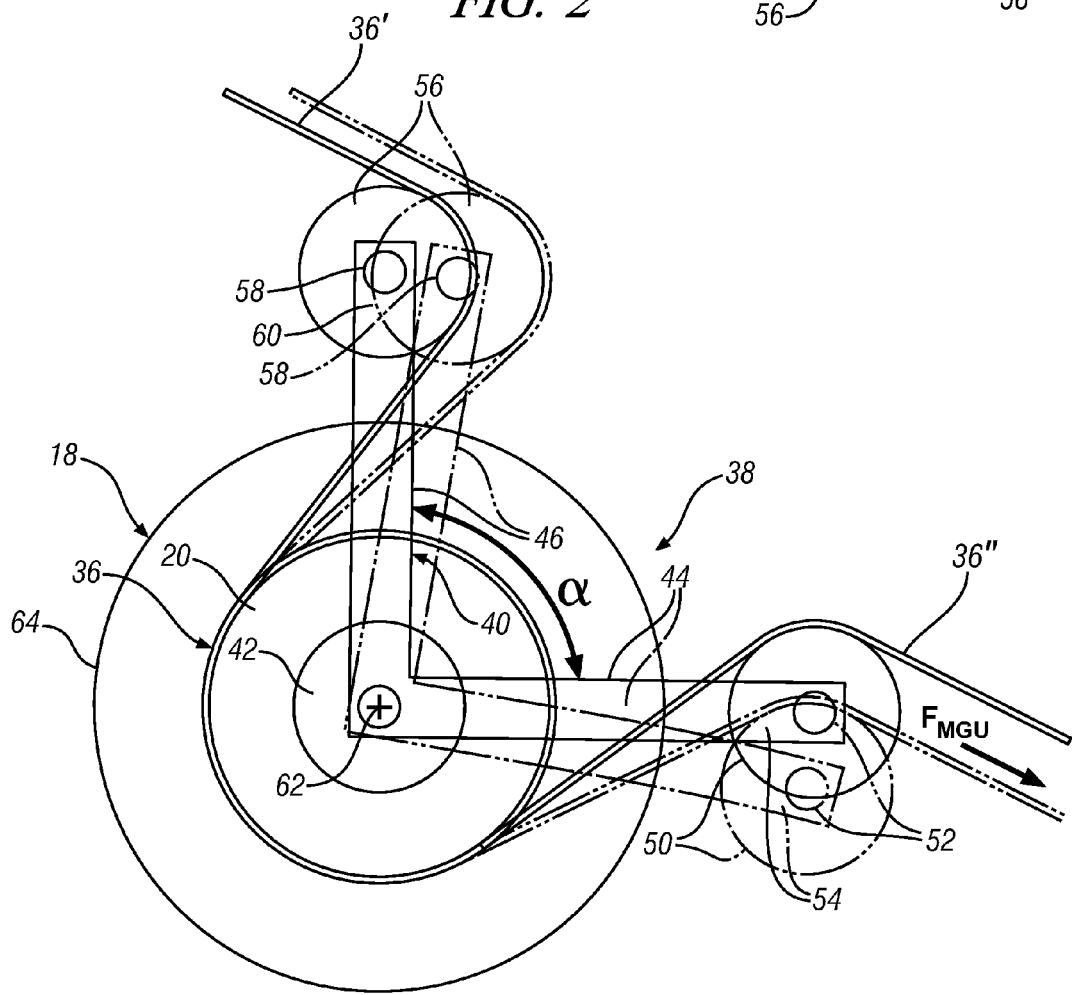
FIG. 3 is a front view of a motor-generator unit and drive belt tensioner from the engine system of FIG. 1.

Referring to FIGS. 1-3, in an exemplary embodiment a drive belt tensioner assembly 38 includes a one piece pulley support 40 having a centrally disposed pivot 42 and first and second cantilevered, spring-like "reaction arms" 44, 46 extending outwardly from the pivot 42. Reaction arm 44 includes a tensioner pulley 50 rotatably mounted on shaft 52 at a first end 54 thereof. Similarly the reaction arm 46 includes a second tensioner pulley 56 rotatably mounted on a second shaft 58 at a first end 60 thereof. The pulley support 40 and the cantilevered reaction arms 44, 46 are constructed of a material which is selected to exhibit a predetermined degree of flexibility when loaded at the ends 54 and 60, as will be described in further detail. The material selected for construction of the pulley support may include flexible metals, composites, laminates or other materials that exhibit stable and repeatable flexibility in environments common with engine applications. The structural configuration of the reaction arms 44, 46 as well as the flexibility, spring rate or material compliance properties (elastic modulus, etc.) of the material will be determined by the forces exerted on the accessory drive system 12 when the MGU 18 is operated in an engine starting mode, as described in further detail below.

The drive belt tensioner assembly 38 is mounted at pivot 42, to the MGU 18 and is configured to be freely rotatable about the axis 62 of the MGU shaft 22. In an exemplary embodiment, this is accomplished by journably mounting the inner end of the pivot 42 between the MGU drive pulley 20 and the MGU shaft 22. As illustrated in FIGS. 1 and 3, drive belt 36 extends circumferentially about the MGU drive pulley 20 and the tensioner pulleys 50 and 56 in a serpentine configuration.

During normal operation of the engine system 10 (crankshaft driven MGU), the tensioner pulley 50 of the drive belt tensioner assembly 38 applies a biasing force that tensions the relatively slack, driven span 36" of drive belt 36 to thereby take up any slack that may be present. Additionally the tensioner pulley 56 rides against the drive belt 36 on the opposite side of the MGU drive pulley 20 on the tensioned belt span 36'. The biasing force applied to the drive belt spans 36' and 36" is a function of the flexibility or stiffness of the material selected to construct the one piece pulley support 40 and associated arms 44, 46 as well as the relative angle "a" between the cantilevered reaction arms as well as the force or tension applied to the drive belt 36 by the crankshaft pulley 14. Due to the flexible material characteristics of the cantilevered reaction arms 44, 46, arm 46 may flex under the loading of the upper belt run 36' on the tensioner pulley 56 to thereby exert a force on the drive belt 36 thus applying a spring-like, force sensitive tensioning on the BAS accessory drive system 12. The positions of the tensioner assembly 38 and the tensioner pulleys 50 and 56 remain relatively constant (self-centering or aligning based on input on the pulleys and rotation about the MGU axis 62 on centrally disposed pivot 42) during normal, steady state engine operation. The tensioner forces experienced by the drive belt 36 as a result of the drive belt tensioner assembly 38 are relatively moderate, though sufficient to control both belt runs 36' and 36" during such operation when the engine is driving the various accessories and the MGU 18. In this manner the forces that are acting on the bearing systems of the various pulleys and accessories are subject to moderate loads sufficient only to drive the accessories and the MGU 18 from the engine drive pulley 14 without belt/pulley slippage.

During rapid changes in engine speed during transient operation of the engine 10 or, upon transition of the MGU 18 from the driven mode to the engine cranking or starting mode, the force generated on the lower belt run 36" by the MGU 18 will urge the drive belt tensioner assembly 38 clockwise, as viewed in phantom in FIG. 3, as the lower belt run is momentarily placed under a rapid and significantly increased tension ("$F_{MGU}$"). As a result of the rotation of the assembly, the second tensioner pulley 56 will be urged against the upper belt run 36' located at the first end of the cantilevered reaction arm 46. Due to the flexible material characteristics of the cantilevered reaction arms 44, 46, arm 44 will flex under the added loading of the lower belt run 36" on the tensioner pulley 50 to thereby exert a force on the drive belt 36 thus applying a spring-like, force sensitive tensioning on the BAS accessory drive system 12. The cantilevered reaction arms 44 and 46 thereby apply a restraining force opposing clockwise movement of the tensioner pulley 50 resulting from the increase in tension applied on the belt 36 in the lower belt run 36" so that the tensioner pulley 50 is allowed to move minimally in the clockwise direction (shown in phantom in FIG. 3). In this operational manner, the initial position of the tensioner pulley 50 is changed a relatively small amount during the short engine starting cycle in which the belt tension in the lower run 36" is significantly increased. At the same time, the tensioner pulley 56 is pivoted into the upper span 36' to take up the increased slack in the upper span while the engine 10 is being started.

Figure 4:
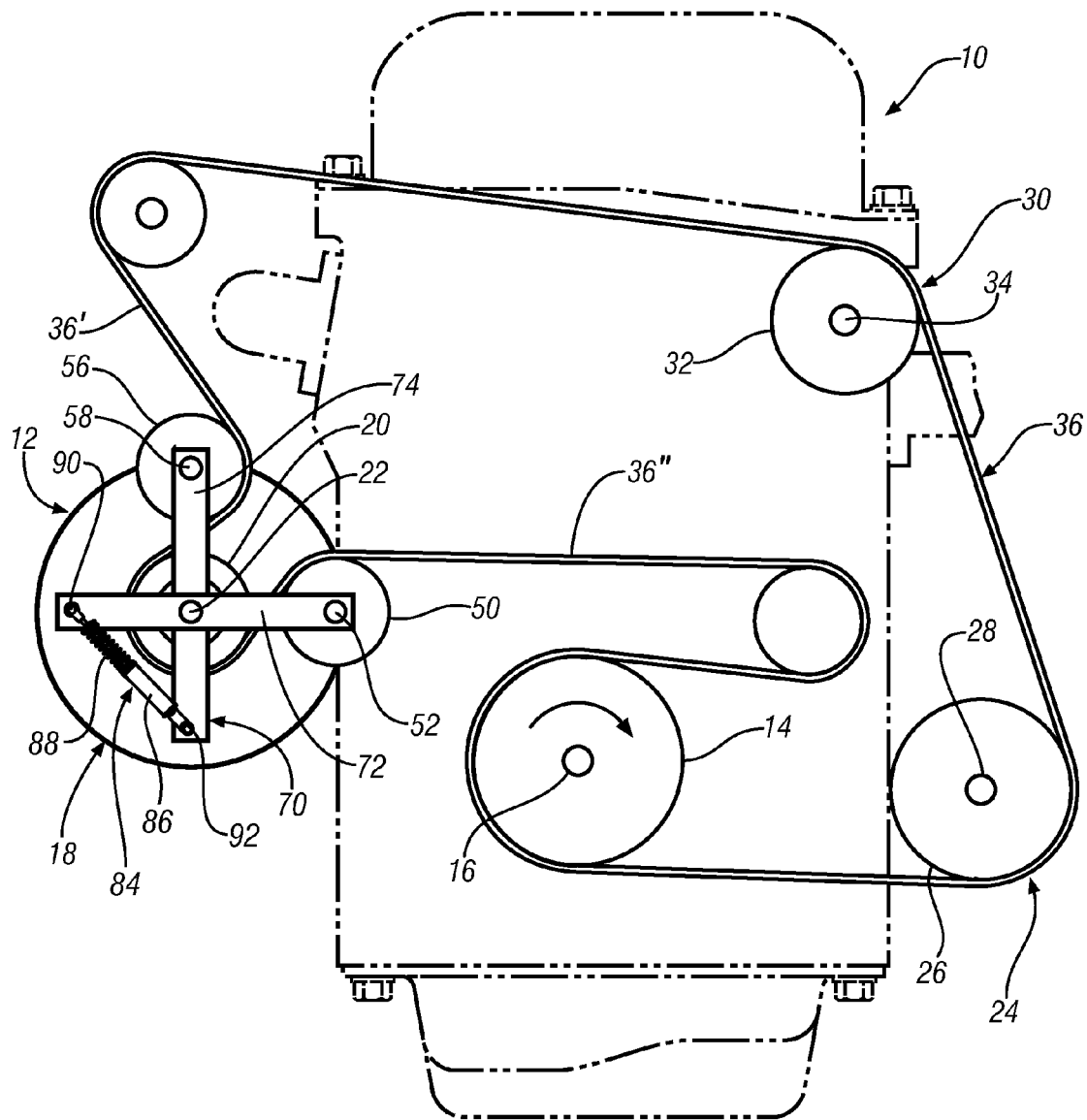
FIG. 4 is a front view of an engine system that embodies features of another embodiment of the present invention.
Figure 5:
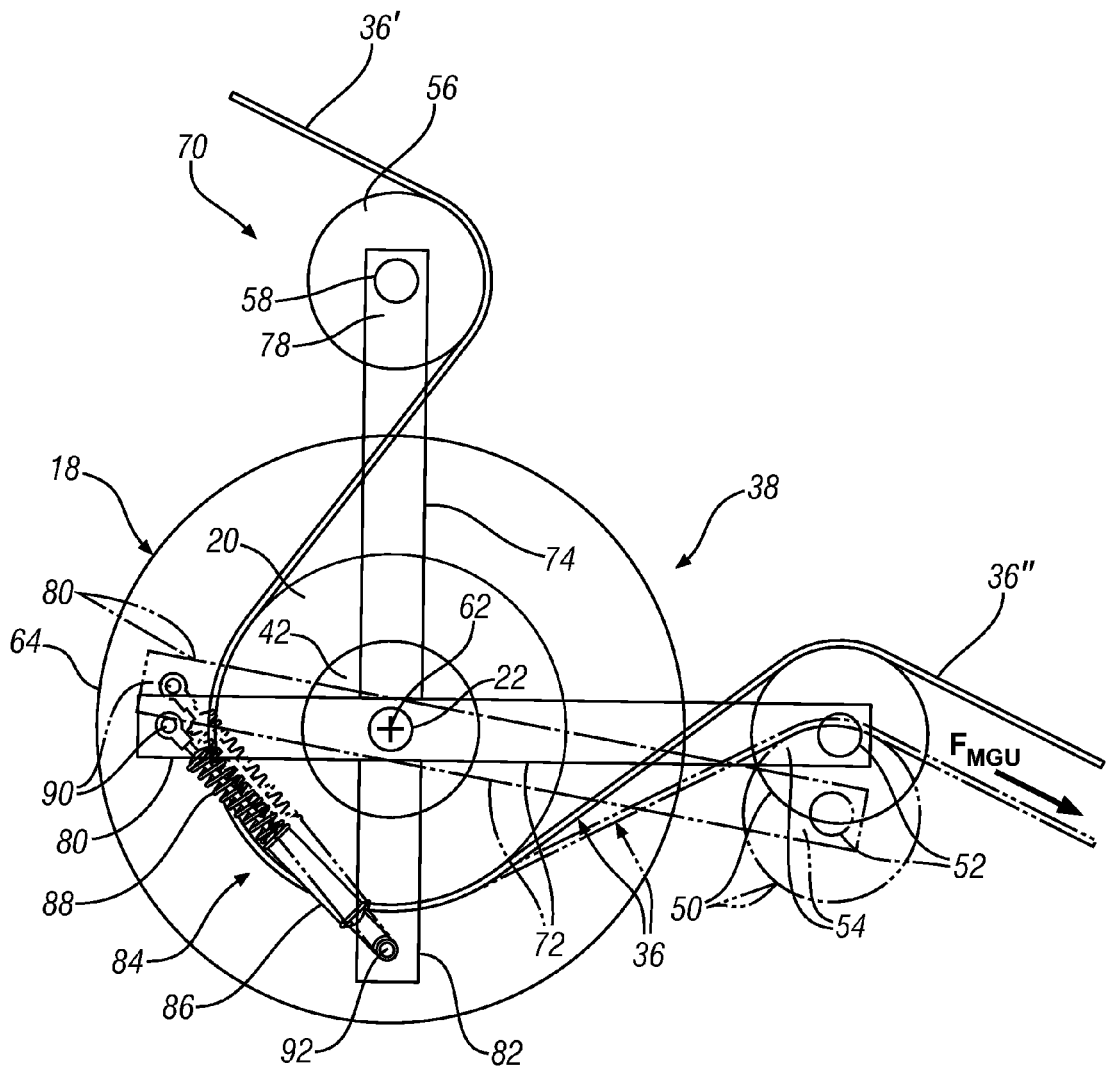
FIG. 5 is a front view of a motor-generator unit and drive belt tensioner from the engine system of FIG. 4.

In another exemplary embodiment illustrated in FIGS. 4 and 5, drive belt tensioner assembly 38 includes a multi-piece pulley support 70 having a centrally disposed pivot 42 to which two, outwardly extending reaction arms 72 and 74 are mounted at a location intermediate of their first and second ends and about which the outwardly extending reaction arms pivot in relation to one another. Reaction arm 72 includes a tensioner pulley 50 rotatably mounted on shaft 52 at a first end 76 thereof. Similarly the reaction arm 74 includes a second tensioner pulley 56 rotatably mounted on a second shaft 58 at a first end 78 thereof.

Extending between, and mounted to the second ends 80, 82 of the outwardly extending reaction arms 72, 74 respectively is a biasing assembly 84 in the form of a hydraulic strut comprising a central hydraulic cylinder 86 surrounded by a compression coil spring 88. Biasing assembly 84 is connected at an eye 90 to the second end 80 of the outwardly extending reaction arm 72 and at an eye 92 on the second end 82 of the outwardly extending reaction arm 74. The biasing assembly 84 is configured so that the compression coil spring 88 continuously biases against the eyes 90, 92 at the second ends 80, 82 of the outwardly extending reaction arms 72, 74 respectively. The biasing action extends the central hydraulic cylinder 86 in a direction toward which the central hydraulic cylinder is internally designed to move freely as well as biasing the tensioner pulleys 50, 56 against the upper and lower runs 36', 36" to maintain the drive belt at a tension which is appropriate for normal, steady state driving of the MGU 18 and the various other engine accessories by the crankshaft mounted, engine drive pulley 14. However, the central hydraulic cylinder 76 includes internal velocity sensitive damping features (not shown) that limit the rate of compression caused by forces that may act against it.

During normal, steady state operation of the engine system 10 (crankshaft driven MGU), the tensioner pulley 50 of the drive belt tensioner assembly 38 tensions drive belt span 36" with a force, determined by the spring rate of the compression coil spring 88, that is sufficient to take up any slack in the belt run while the tensioner pulley 56 rides against the drive belt 36 on the opposite side of the MGU drive pulley 20 on the tensioned belt span 36'. The positions of the tensioner assembly 38 and the relative positions of the outwardly extending reaction arms 72, 74 remain relatively constant during such engine operation. The tensioner forces applied to the drive belt 36 are relatively moderate, though sufficient to control both belt runs 36' and 36" during such operation when the engine is driving the various accessories and the MGU 18. In this manner the forces that are acting on the bearing systems of the various pulleys and accessories are subject to moderate loads sufficient only to drive the accessories and the MGU 18 from the engine drive pulley 14 without belt/pulley slippage.

During rapid changes in engine speed during transient operation of the engine 10 or, upon transition of the MGU 18 from a driven mode to an engine cranking or starting mode, the biasing force of the compression coil spring 88 is insufficient to hold the second tensioner pulley 56 in position against the force ("$F_{MGU}$") generated on the lower belt run 36". Under the later, relatively short period of operation of the BAS accessory drive system 12, the central hydraulic cylinder 86 applies a hydraulic damping force to the biasing assembly 84 that restrains contraction (relative closure of the second ends 80, 82 of the outwardly extending reaction arms 72, 74 due to the rapidly increased outward force on the tensioner pulley 50 by the lower drive belt run 36") to a slow rate of change, thus applying velocity sensitive damping to the BAS accessory drive system 12. The central hydraulic cylinder 86 thus applies a restraining force opposing relative movement of the outwardly extending reaction arms 72, 74. In this operational mode, the initial position of the tensioner pulley 50 is changed a relatively small amount during the relatively short engine starting cycle in which the belt tension in the lower run 36" is significantly increased. At the same time, as a result of the rotation of the drive belt tensioner assembly 38 about the centrally disposed pivot 42, the tensioner pulley 56 is pivoted into the upper span 36' as necessary to take up the increased slack in the upper span while the engine 10 is being started.

By providing an MGU mounted drive belt tensioner assembly 38 that includes multiple tensioner pulleys 50 and 56 that are operable to maintain the proper tension in both upper and lower runs 36' and 36" of the accessory drive belt 36 a single assembly may be used for multiple BAS hybrid engine applications without the need for major repackaging efforts or engine modifications for each engine/vehicle application. The exemplary MGU mounted drive belt tensioner assembly 38 may be supplied to the engine or vehicle assembly plant as a single unit that can be used for multiple BAS hybrid engine applications with only a re-tuning (based on engine power and other variables) of the flexibility characteristics of the cantilevered reaction arms 44, 46 in the case of a one piece pulley support 40 or a retuning of the damping/biasing characteristics of the central hydraulic cylinder 86 and compression coil spring 88 in the case of the multi-piece pulley support 70. Such a tensioning device with near "universal" application can have the effect of pre-defining certain front-of-engine packaging requirements thereby freeing up other packaging space for engine technology enhancements.

Although the invention has been described primarily with reference to a BAS hybrid engine system is has been contemplated that there are applications for the invention in non-BAS systems that may require a high degree of short-term drive belt tensioning such as in higher performance engines in which rapid speed excursions may frequently be expected and, therefore the invention should not be limited to the descriptive embodiments included herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A drive belt tensioner assembly for mounting to a motor-generator unit, the drive belt tensioner assembly comprising:
   a pulley support having a centrally located pivot defining a pivot axis, the pivot having an axial inner end and an axial outer end disposed along the pivot axis, and the pivot having a radially outward cylindrical surface extending from the axial inner end to the axial outer end such that the centrally located pivot is capable of being journally mounted radially within a drive pulley of the motor-generator unit;
   first and second spring-like reaction arms extending radially outwardly from, and along an axis that extends through, the centrally located pivot to define an angle therebetween; and
   tensioner pulleys rotatably mounted to first ends of each of the first and second reaction arms and configured to bias a drive belt on both sides of a motor-generator unit drive pulley to maintain tension on a drive belt during driving and driven modes of the motor-generator unit.

2. The drive belt tensioner assembly of claim 1, wherein the pulley support comprises a one-piece member having the reaction arms cantilevered outwardly from the centrally located pivot.

3. The drive belt tensioner assembly of claim 2, wherein the one-piece member is constructed of a flexible metal, composite or laminate material, or a combination thereof.

4. The drive belt tensioner assembly of claim 3, wherein the structural configuration of the reaction arms as well as the flexibility, spring rate or material compliance properties thereof are determined by the forces exerted on the drive belt when the a motor-generator unit is operated in an engine starting mode.

5. The drive belt tensioner assembly of claim 1, wherein the centrally located pivot is journably mountable about a shaft of a motor-generator unit and is freely rotatable thereabout.

6. The drive belt tensioner assembly of claim 1, wherein the pulley support is constructed of a material selected to exhibit a predetermined degree of flexibility when loaded at the first ends of each of the first and second reaction arms.

7. The drive belt tensioner assembly of claim 1, wherein the pulley support is constructed of material that exhibits repeatable flexibility.

8. The drive belt tensioner assembly of claim 5, wherein an inner end of the centrally located pivot is journably mounted between the motor-generator unit drive pulley and a shaft of the motor-generator unit.

9. An accessory drive system for an engine having a motor-generator unit for driving and being driven by the engine, the accessory drive system comprising:
   a first driven pulley connected with an engine crankshaft and rotatable therewith;
   a second driven pulley, connected with the motor-generator unit and rotatable therewith;
   a drive belt connecting the first driven pulley and the second driven pulley for driving either pulley from the other pulley;
   a drive belt tensioner assembly mounted to the motor-generator unit, the drive belt tensioner assembly comprising:
      a pulley support having a centrally located pivot defining a pivot axis, the pivot having an axial inner end and an axial outer end disposed along the pivot axis, and the pivot having a radially outward cylindrical surface extending from the axial inner end to the axial outer end, the centrally located pivot being journally mounted, radially within the second driven pulley, about a shaft of the motor-generator unit and freely rotatable thereabout;

first and second spring-like reaction arms extending radially outwardly from, and along an axis that extends through, the centrally located pivot to define an angle therebetween; and tensioner pulleys rotatably mounted to first ends of each of the first and second reaction arms wherein the reaction arms are configured to bias a drive belt on both sides of the second driven pulley to maintain a drive belt tension during driving and driven modes of the motor-generator unit.

10. The accessory drive system of claim 9, wherein the pulley support comprises a one-piece member having the reaction arms cantilevered outwardly from the centrally located pivot.

11. The accessory drive system of claim 10, wherein the one-piece member is constructed of a flexible metal, composite or laminate material, or a combination thereof.

12. The accessory drive system of claim 11, wherein the structural configuration of the reaction arms as well as the flexibility, spring rate or material compliance properties thereof are determined by the forces exerted on the drive belt when the a motor-generator unit is operated in an engine starting mode.

* * * * *